(12) United States Patent
Witzel et al.

(10) Patent No.: US 12,381,462 B2
(45) Date of Patent: Aug. 5, 2025

(54) ACTUATOR FOR A VEHICLE ASSEMBLY

(71) Applicant: BROSE FAHRZEUGTEILE SE & CO. KOMMANDITGESELLSCHAFT, COBURG, Coburg (DE)

(72) Inventors: Timo Witzel, Flieden (DE); Dominik Brietz, Gerolzhofen (DE); Alexander Kifer, Mistelbach (DE); Helmut Pfalzgraf, Eibelstadt (DE); Uwe Sommer, Effelder (DE); Thomas Susemihl, Würzburg (DE); Christian Mergl, Zeil/Main (DE)

(73) Assignee: BROSE FAHRZEUGTEILE SE & CO. KOMMANDITGESELLSCHAFT, COBURG (DE)

( * ) Notice: Subject to any disclaimer, the term of this patent is extended or adjusted under 35 U.S.C. 154(b) by 0 days.

(21) Appl. No.: 18/017,580

(22) PCT Filed: Jul. 23, 2021

(86) PCT No.: PCT/EP2021/070715
§ 371 (c)(1),
(2) Date: Jan. 23, 2023

(87) PCT Pub. No.: WO2022/018274
PCT Pub. Date: Jan. 27, 2022

(65) Prior Publication Data
US 2023/0299653 A1    Sep. 21, 2023

(30) Foreign Application Priority Data
Jul. 23, 2020 (DE) ..................... 10 2020 209 303.2

(51) Int. Cl.
*H02K 7/116* (2006.01)
*F16H 19/08* (2006.01)
(Continued)

(52) U.S. Cl.
CPC ............. *H02K 37/14* (2013.01); *F16H 19/08* (2013.01); *H02K 7/063* (2013.01); *H02K 7/1166* (2013.01); *H02K 37/24* (2013.01); *B60N 2/976* (2018.02)

(58) Field of Classification Search
CPC ...... H02K 1/145; H02K 7/1166; H02K 37/08; H02K 37/14
(Continued)

(56) References Cited

U.S. PATENT DOCUMENTS

| 495,562 A | 4/1893 | Perret |
|---|---|---|
| RE28,075 E | 7/1974 | Kavanaugh |

(Continued)

FOREIGN PATENT DOCUMENTS

| CN | 109854714 A | 6/2019 |
|---|---|---|
| DE | 431571 C | 7/1926 |

(Continued)

OTHER PUBLICATIONS

Translation of EP-0038739-A1 (Year: 1981).*
(Continued)

*Primary Examiner* — Randell J Krug
(74) *Attorney, Agent, or Firm* — Dickinson Wright PLLC

(57) ABSTRACT

An actuator includes an electric motor having a stator and a rotor that can be rotated relative to the stator about an axis of rotation (D). The stator comprises an inner stator part, a first outer stator part and a second outer stator part, wherein the inner stator part, the first outer stator part and the second outer stator part are aligned with one another along the axis of rotation (D) and the inner stator part forms an arrange-
(Continued)

ment of first inner stator poles on a first side axially facing the first outer stator part, and forms an arrangement of second inner stator poles on a second side axially facing the second outer stator part, wherein the first inner stator poles and the second inner stator poles are integrally connected to one another as a single piece.

16 Claims, 10 Drawing Sheets

(51) Int. Cl.
    *H02K 7/06*         (2006.01)
    *H02K 37/14*       (2006.01)
    *H02K 37/24*       (2006.01)
    *B60N 2/90*        (2018.01)

(58) Field of Classification Search
    USPC .............................................. 310/257, 49.09
    See application file for complete search history.

(56) References Cited

U.S. PATENT DOCUMENTS

| | | | |
|---|---|---|---|
| 4,311,934 A | 1/1982 | Flaig | |
| 4,381,465 A * | 4/1983 | Renkl | H02K 19/06 |
| | | | 310/49.12 |
| 4,733,114 A | 3/1988 | Suyama et al. | |
| 4,823,038 A | 4/1989 | Mizutani et al. | |
| 5,331,237 A * | 7/1994 | Ichimura | H02K 37/14 |
| | | | 310/49.15 |
| 5,770,900 A * | 6/1998 | Sato | H02K 3/525 |
| | | | 310/43 |
| 5,925,945 A * | 7/1999 | Aoshima | H02K 37/14 |
| | | | 310/40 MM |
| 6,008,554 A | 12/1999 | Gerling | |
| 6,031,305 A * | 2/2000 | Satoh | H02K 37/18 |
| | | | 310/194 |
| 6,809,438 B2 * | 10/2004 | Suzuki | H02K 37/14 |
| | | | 310/156.45 |
| 7,692,355 B2 * | 4/2010 | Ihle | H02K 5/02 |
| | | | 310/43 |
| 7,969,060 B2 * | 6/2011 | Ihle | H02K 1/145 |
| | | | 310/257 |
| 8,446,063 B2 * | 5/2013 | Kinpara | H02K 37/14 |
| | | | 310/49.15 |
| 8,955,396 B2 * | 2/2015 | Bae | G01L 3/104 |
| | | | 73/862.334 |
| 9,356,500 B2 * | 5/2016 | Furlan | H02K 37/12 |
| 10,714,991 B2 * | 7/2020 | Lindner | H02K 21/14 |
| 2007/0262660 A1 * | 11/2007 | Utsumi | H02K 1/14 |
| | | | 310/49.01 |
| 2008/0303374 A1 * | 12/2008 | Yokoyama | H02K 37/14 |
| | | | 310/254.1 |
| 2012/0038231 A1 * | 2/2012 | Oda | H02K 7/083 |
| | | | 310/90 |
| 2018/0219435 A1 | 8/2018 | Billet et al. | |
| 2022/0231563 A1 * | 7/2022 | Uchibori | H02K 7/088 |

FOREIGN PATENT DOCUMENTS

| | | | | |
|---|---|---|---|---|
| DE | 2911439 C2 | | 12/1982 | |
| DE | 102006034567 A1 | * | 2/2007 | ............ H02K 1/145 |
| EP | 0038739 A1 | * | 10/1981 | |
| EP | 0043068 B1 | | 2/1984 | |
| EP | 0780956 A1 | | 6/1997 | |
| JP | H1042542 A | | 2/1998 | |
| JP | 2000023445 A | | 1/2000 | |
| JP | 2019520027 A | | 7/2019 | |
| KR | 20180033253 A | | 4/2018 | |
| WO | 2018006954 A1 | | 1/2018 | |

OTHER PUBLICATIONS

Machine translation of DE-102006034567-A1 (Year: 2007).*
Machine translation of EP-0038739-A1 (Year: 1981).*
Website https://de.wikipedia.org/w/index.php?title=Keilwelle&oldid=197884736 "Wikipedia, Spline Shaft", English Translation attached to original, Dated Mar. 19, 2020, All together 6 Pages.
Korean Office Action for KR 10-2023-7006255, Dated Aug. 8, 2024, English Translation/ Summary attached to original, All together 11 Pages.

* cited by examiner

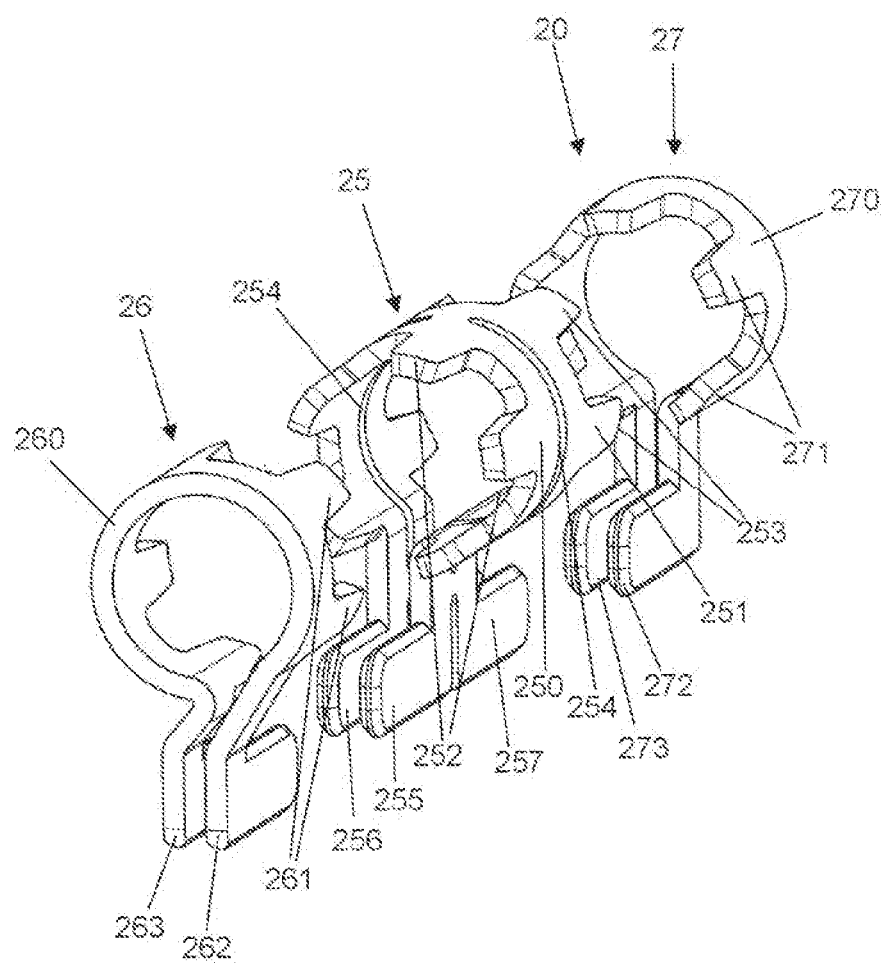

A-A

ACTUATOR FOR A VEHICLE ASSEMBLY

CROSS-REFERENCE TO RELATED APPLICATIONS

This application is the U.S. National Phase of PCT/EP2021/070715 filed Jul. 23, 2021, which claims priority to German Application No. DE 10 2020 209 303.3 filed Jul. 23, 2020, the entire disclosures of which are incorporated by reference herein.

TECHNICAL FIELD

The disclosure relates to an actuator according to the embodiments disclosed below.

BACKGROUND

Such an actuator may include an electric motor having a stator and a rotor which can be rotated relative to the stator about an axis of rotation.

Such an actuator can serve, for example, for adjusting a vehicle assembly. In this case, the actuator has, for example, a gear mechanism which can be driven by the electric motor and which forms an output for adjusting the vehicle assembly. The rotor is operatively connected to the gear mechanism such that an adjusting force can be introduced via the rotor into the gear mechanism and thereby into the vehicle assembly.

Such an actuator is designed, for example, to adjust a vehicle assembly in the form of an interior part, for example an assembly of a vehicle seat or a different adjustment assembly, for example on a dashboard, on a console (for example in the form of a storage device, a cover device, a flap device or the like). Such an actuator, however, can also serve for driving other assemblies, for example for a vibration device in a vehicle seat.

It can be generally assumed that, in future interior scenarios in a vehicle, completely different assemblies can be driven by electric motor, wherein individual actuators which are attached to the respective assembly and which are controlled via a central controller, for example, are used for driving the different assemblies.

In such an actuator, there is generally a requirement for an arrangement which is efficient in terms of installation space, for example, in order to be able to use the actuator on assemblies without having to increase significantly the required installation space for the assigned assembly. In such an actuator, there is generally also the desire for a cost-effective design with simple production, reliable operation and also variable applicability.

An actuator of the above-described type can be designed, for example, as a so-called claw pole stepping motor. In such a claw pole stepping motor, the stator is generally implemented by stator parts in the form of stator laminations, the stator coils being wound around the stator laminations, as is described, for example, in EP 0 780 956 A1 or EP 0 043 068 B1.

In such a claw pole stepping motor the stator is generally composed of a plurality of stator parts. A claw pole stepping motor is disclosed in JP 4216369 B2, for example, in which the stator is formed by two pairs of stator parts which face one another with stator poles, wherein a stator coil is assigned to each pair of stator parts in order to supply a magnetic flux into the stator parts (implementing the return plates). The stator coils are not wound around the stator parts but are arranged adjacently thereto and to the side of the stator parts and thus eccentrically offset relative to the stator parts.

An electric motor comprising a multi-part stator is disclosed in DE 10 2006 034 567 A1, in which stator parts with stator poles which face one another are positioned on one another. A rotor can be rotated relative to the stator which is formed in this manner and is operatively connected to a gear mechanism for providing an output.

SUMMARY

It is the object of the present invention to provide an actuator which can be configured in a simple manner and advantageously in terms of installation space, with variable applicability for driving a vehicle assembly, such as an interior assembly.

This object is achieved by an object having the features described below.

Accordingly, the stator comprises an inner stator part, a first outer stator part and a second outer stator part. The inner stator part, the first outer stator part and the second outer stator part are line up next to one another along the axis of rotation. The inner stator part forms an arrangement of first inner stator poles on a first side axially facing the first outer stator part, and forms an arrangement of second inner stator poles on a second side axially facing the second outer stator part. The first inner stator poles and the second inner stator poles are connected to one another integrally and in a single piece.

In the actuator, the stator is accordingly configured in (at least) three parts, with an inner stator part and axially offset outer stator parts arranged on either side thereof. The inner stator part forms first inner stator poles which face the first outer stator part and cooperate with the first outer stator part. The inner stator part additionally forms second inner stator poles which face the second outer stator part and cooperate with the second outer stator part. The stator poles cooperate with the respectively assigned outer stator part for forming a magnetic circuit, so that two magnetic circuits are formed via the inner stator part.

Since the first stator poles and the second stator poles of the inner stator part are formed integrally and in a single piece with one another, this results in a simple design in which the inner stator part can be formed as a whole integrally and in a single piece. A single inner stator part in cooperation with the outer stator parts arranged on either side is sufficient for forming the two magnetic circuits. This results in a simple design with simple manufacture and also a stable configuration.

In one embodiment, the inner stator part comprises a first body portion on which the first stator poles are formed. The first body portion is formed integrally and in a single piece with the second body portion on which the second stator poles are arranged. The inner stator part thus can be formed as a whole integrally and in a single piece with two body portions which, on the one hand, form the first inner stator poles and, on the other hand, the second inner stator poles.

Due to the single-piece design of the inner stator part, for example, a process step can be dispensed with during the manufacture of the stator, by a connecting step not being required for connecting separate inner stator parts (as might be required if the inner stator poles were formed on separate structural elements). This permits a reduction in the manufacturing time and also in the manufacturing costs.

For example, the inner stator part can be formed integrally and in a single piece as a stamped-bent part ("Stanz-Biege- Teil"). The stator part can be formed in this manner from sheet metal, such as a soft magnetic sheet metal, wherein for the manufacturing process the stator part can be stamped from the sheet metal and then can be bent into a round shape, for example, corresponding to a cylindrical basic shape, so that the inner stator part can rotatably receive the rotor.

The outer stator parts, for example, are also formed in each case as stamped-bent parts, for example from a soft magnetic material.

In one embodiment, the first outer stator part forms an arrangement of first outer stator poles for electromagnetic cooperation with the first inner stator poles. Additionally or alternatively, the second outer stator part can form an arrangement of second outer stator poles for electromagnetic cooperation with the second inner stator poles. The first inner stator poles of the inner stator part face the first outer stator poles of the first outer stator part, for example by the stator poles engaging in one another in the manner of axially extended fingers. Accordingly, the second inner stator poles of the inner stator part are assigned and face the second outer stator poles of the second outer stator part, for example by the second inner stator poles and the second outer stator poles engaging in one another in the manner of axially extended fingers. Thus two pairs of stator pole arrangements are formed, in each case the stator pole arrangements being able to form a magnetic circuit and in each case being able to be assigned to a stator coil, so that a magnetic flux can be supplied into the respectively assigned magnetic circuit.

In one embodiment, the first outer stator poles and the first inner stator poles engage in one another such that the first outer stator poles and the first inner stator poles are lined up next to one another alternately in a circumferential direction oriented about the axis of rotation. Additionally or alternatively, the second outer stator poles and the second inner stator poles engage in one another such that the second outer stator poles and the second inner stator poles are lined up next to one another alternately in a circumferential direction oriented about the axis of rotation. The inner stator poles and the respectively assigned outer stator poles may extend in each case axially in the manner of fingers from an assigned body portion of the respective stator part. The finger-like stator poles of the inner stator part and the respectively assigned outer stator part engage in a nested manner in one another so that—when viewed in the circumferential direction—a sequence of stator poles is produced in which in each case an outer stator pole follows an inner stator pole and vice versa. This results in a first magnetic circuit between the first inner stator poles and the first outer stator poles and a second magnetic circuit between the second inner stator poles and the second outer stator poles. Each magnetic circuit can be supplied via an assigned stator coil, thus in order to set the permanent-magnet rotor in rotational motion, for example, in the manner of a claw pole stepping motor.

In one embodiment, the first inner stator poles and the second inner stator poles are trapezoidal, when viewed along an imaginary envelope surface circumferentially enclosing the inner stator part about the axis of rotation. The enclosing envelope surface corresponds to an imaginary cylindrical surface which encloses the cylindrical component of the stator.

The outer stator poles can be formed in a complementary manner to the inner stator poles so that the first outer stator poles are in engagement in a complementary manner with the first inner stator poles and the second outer stator poles are in engagement in a complementary manner with the second inner stator poles. This results in a relatively small air gap between adjacent stator poles.

In one embodiment, the first inner stator poles and the second inner stator poles are offset to one another by an angular offset, when viewed in a circumferential direction about the axis of rotation. The first inner stator poles are periodically arranged in the circumferential direction about the axis of rotation. Similarly, the second inner stator poles are also periodically arranged in the circumferential direction about the axis of rotation. In the periodic sequence of the first inner stator poles and the second inner stator poles, however, there is an angular offset so that the first inner stator poles and the second inner stator poles are not axially aligned with one another but are offset to one another by a specific angle in the circumferential direction.

This angular offset, for example, can be less than or equal to a quarter of the period angle, wherein the period angle is determined by the angular distance between two adjacent first inner stator poles or accordingly the angular distance between two adjacent second inner stator poles.

In the case of a 10-pole stator, for example, in which five first inner stator poles are assigned to five first outer stator poles and five second inner stator poles are assigned to five second outer stator poles, the periodic angular distance between the adjacent first inner stator poles and accordingly between the adjacent second inner stator poles is 72°. If the angular offset between the first inner stator poles and the second inner stator poles, for example, corresponds to a quarter of the periodic angular distance, the angular offset is 18°.

By means of such an angular offset between the inner stator poles and accordingly the assigned magnetic circuits, a stepping motor in the manner of a claw pole stepping motor can be obtained with a relatively small increment. The rotor can be designed with permanent magnets, comprising magnet arrangements which are arranged on the rotor and which in each case are assigned to one of the magnetic circuits and, in the case of an angular offset arrangement of the magnetic circuits, can be oriented without an angular offset to one another.

In one embodiment, the motor comprises a first stator coil and a second stator coil. The inner stator part can form at least one first inner engagement portion which engages in the first stator coil and thus bears the first stator coils. Additionally, the inner stator part can form at least one second inner engagement portion which engages in the second stator coil and thus bears the second stator coil.

The engagement portions can be formed, for example, radially outside the stator poles, for example in the manner of lugs at the bent-back ends of the inner stator part which is formed as a stamped-bent part ("Stanz-Biege-Teil"). Chamfers, which permit a simple insertion of the engagement portions into the coil body of the respective stator coil, can be formed on the inner engagement portions.

Advantageously, outer engagement portions are also formed on the outer stator parts, the outer engagement portions serving for engagement in the stator coils and together with the engagement portions of the inner stator part bearing the stator coils. For example, the first outer stator part can comprise at least one first outer engagement portion which is arranged so as to overlap with the at least one first inner engagement portion and engages in the first stator coil. Additionally or alternatively, the second outer stator part can comprise at least one second outer engagement portion which is arranged so as to overlap with the at least one second inner engagement portion and engages in the second stator coil. The outer engagement portions can also be formed in the manner of lugs at the ends of the outer stator parts which are formed as stamped-bent parts ("Stanz-Biege-Teile"), wherein the outer engagement portions together with the inner engagement portions of the inner stator part bear the stator coils and thus close the respective magnetic circuit.

For example, the inner stator part can form two first inner engagement portions and two second inner engagement portions. Additionally, each outer stator part can form two outer engagement portions. The first outer engagement portions of the first outer stator part can be arranged in a sandwiched arrangement, overlapping and alternating with the first inner engagement portions of the inner stator part, and thus form with the first inner engagement portions a laminated core on which the first stator coil is arranged. Accordingly, the second outer engagement portions of the second outer stator part can also be arranged in a sandwiched arrangement, overlapping and alternating with the second inner engagement portions of the inner stator part, and thus form with the second inner engagement portions a laminated core on which the second stator coil is arranged.

The outer engagement portions can also comprise each a chamfer on one edge so that the engagement portions can be easily joined to the stator coils.

In one embodiment, each, the first stator coil and the second stator coil, comprises a coil body and a coil winding arranged on the coil body. The coil body can form, for example, an engagement opening in which the inner engagement portions of the inner stator part and also the respectively assigned outer engagement portions of the outer stator part engage. By the provision of chamfers on the engagement portions, the insertion into the engagement opening is facilitated and the joining of the stator thus simplified.

In one embodiment, the coil body forms a winding portion on which the coil winding is arranged. The winding portion has a crowned shape so that sharp edges are avoided on the winding portion and the coil winding can be wound around the winding portion in an advantageous manner in terms of installation space. This results in a non-positive and tightly packed arrangement of the winding wire on the winding portion, wherein additionally a molding compound, for example in the manner of a casting compound, can be arranged on the winding portion in order to encapsulate the coil winding. In this manner, a movement of the wire due to electromagnetic forces during operation is prevented and thus the generation of noise on the stator coils is avoided.

In one embodiment, the motor comprises a control unit. The coil winding of each stator coil is electrically connected by at least one wire end to the control unit, for example by the wire end being connected by a material connection (material bond) to a printed circuit board of the control unit.

It is also conceivable that the stator coil has connecting pins, to which wire ends of the assigned coil winding are connected and which can facilitate the production of a soldered connection with a printed circuit board of the control unit.

In one embodiment, the rotor comprises a first magnet arrangement assigned to the arrangement of the first inner stator poles and a second magnet arrangement assigned to the arrangement of the second inner stator poles. The first magnet arrangement and the second magnet arrangement are offset to one another axially along the axis of rotation. Each magnet arrangement can be formed, for example, by an arrangement of one or more permanent magnets or differently magnetized portions on a magnetic body. The magnet arrangements cooperate with the magnetic circuits of the stator poles and permit the rotor to be driven in a stepwise fashion, in the manner of a claw pole stepping motor in which the rotor can be adjusted in discrete steps, by the rotor with the magnet arrangements arranged thereon following the magnetic field on the magnetic circuits of the stator.

The first magnet arrangement can be configured, for example, to cooperate with the first inner stator poles for generating a torque on the rotor, while the second magnet arrangement is configured to cooperate with the second inner stator poles for generating a torque on the rotor. The first magnet arrangement thus cooperates with the first magnetic circuit formed via the first inner stator poles. The second magnet arrangement accordingly cooperates with the second magnetic circuit formed via the second inner stator poles. Together, the magnet arrangements in cooperation with the magnetic circuits generate a torque on the rotor.

The magnet arrangements can be positioned in a simple manner relative to one another, for example, on a motor shaft of the rotor. For example, the first magnet arrangement has at least one first form-fitting element ("Formschlusselement") while the second magnet arrangement forms at least one second form-fitting element. The at least one first form-fitting element and the at least one second form-fitting element are brought into engagement with one another, for example on the motor shaft, when the magnet arrangements are attached, so that the magnet arrangements are automatically brought into a predetermined rotational position relative to one another and thus rotationally positioned relative to one another.

Each form-fitting element can be formed, for example, on a front face of the respective magnet arrangement facing the respective other magnet arrangement, for example in the form of an elevation or in the form of a recess. The respective other magnet arrangement has a complementary form-fitting element so that the form-fitting elements are brought into engagement with one another and thus the magnet arrangements can be rotationally positioned in a defined manner relative to one another.

In a further embodiment, however, only one (single) magnet arrangement can be provided on the rotor, the magnet arrangement being configured integrally and being able to be arranged as a unit on the motor shaft. The magnet arrangement is configured to cooperate both with the first inner stator poles and with the second inner stator poles for generating a torque on the rotor. The magnet arrangement can have, for example, one or more permanent magnets or differently magnetized portions on a magnetic body.

In one embodiment, the actuator comprises a gear mechanism which can be driven by the electric motor and which forms an output for adjusting the vehicle assembly. This output is formed, for example, by an output gear which can be driven by the gear mechanism. The output gear can be operatively connected, for example, via one or more gearwheels to the motor shaft, so that the output gear is driven by the motor and can be set in rotational motion (in a stepwise manner). Via the output gear an adjusting force can be output to an assigned vehicle assembly so that the vehicle assembly can be adjusted via the output gear.

For example, the output gear can form a first output element and a second output element which is different from the first output element. The first output element can be formed, for example, on a first side of the output gear, while the second output element is formed on a second side of the output gear facing away from the first side.

Via the different output elements a variable interface can be provided for connecting the actuator to a vehicle assembly to be adjusted. Thus a vehicle assembly can be selectively coupled to the first output element or the second output element, in order to introduce an adjusting force into the vehicle assembly. The first output element can be formed, for example, in the manner of a pinion which is in engagement with an assigned toothed element of the vehicle assembly via external teeth and can drive the vehicle assembly thereby. The second output element can accordingly be formed, for example, by a toothed engagement portion which forms inner teeth in the manner of a ring gear and can be coupled by form fitting, for example, to a shaft.

In a further embodiment, the actuator can serve for driving a vibration device, for example, wherein the actuator in this case generates a vibration via an imbalance element connected to the rotor. The motor in this case can be fixedly connected, for example, to an assembly to be driven, wherein by driving the rotor the imbalance element is set in rotational motion and thereby produces a vibrating motion on the motor which is transmitted to the assembly to be driven and thus excites the assembly to be driven into vibration.

In this embodiment, the imbalance element is connected to the rotor and comprises an eccentric portion relative to the axis of rotation of the rotor for providing an imbalance on the rotor. The eccentric portion extends, for example, radially from the rotor such that the imbalance element as a whole has an eccentric shape and thus provides an imbalance on the rotor.

In one embodiment, the imbalance element is arranged outside the stator formed by the inner stator part, the first outer stator part and the second outer stator part. The imbalance element is thus located (axially) outside the stator and is connected to the rotor. If the rotor is driven in rotation, the imbalance element rotates outside the stator. This results in a simple arrangement with simple components which can be easily joined together.

In a further embodiment, the imbalance element is arranged inside the inner stator part. The imbalance element is located axially at the location of the inner stator part and is arranged radially inside the inner stator part. The imbalance element can be arranged, for example, between a first magnet arrangement which is assigned to the first inner stator poles, and a second magnet arrangement which is assigned to the second inner stator poles. In this case, the imbalance element is thus integrated in the motor. This results in an efficient arrangement in terms of installation space in which the imbalance element requires no additional installation space.

An actuator of the above-described type can be configured in principle with a completely different number of poles. Thus the actuator can be configured, for example, with 8-poles, 10-poles or 12-poles, wherein other numbers of poles are also conceivable. The number of poles relates to the total number of stator poles of each magnetic circuit. With a 10-pole motor the inner stator part, for example, has five first inner stator poles and five assigned first outer stator poles for the first magnetic circuit and five second inner stator poles and five assigned second outer stator poles for the second magnetic circuit.

The stator parts serve, for example, as magnetic return plates for providing the different magnetic circuits, wherein exactly one stator coil may be assigned to each magnetic circuit for supplying a magnetic flux (variable over time). The stator parts may be formed in each case integrally and in a single piece from a soft magnetic material, such as a soft iron.

One example of an idea underlying the disclosure may be described in more detail hereinafter with reference to the exemplary embodiments shown in the figures. In the figures:

BRIEF DESCRIPTION OF THE DRAWINGS

FIG. 8 shows a perspective exploded view of the stator parts of the stator;

DETAILED DESCRIPTION

Figure 1:
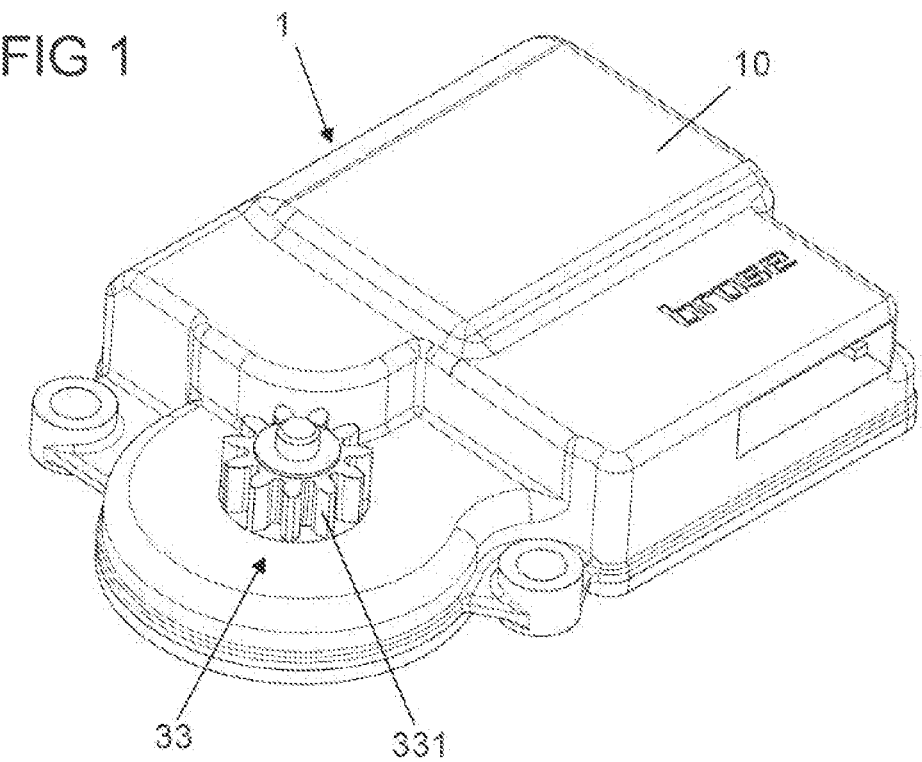
FIG. 1 shows a view of an exemplary embodiment of an actuator.
Figure 2:
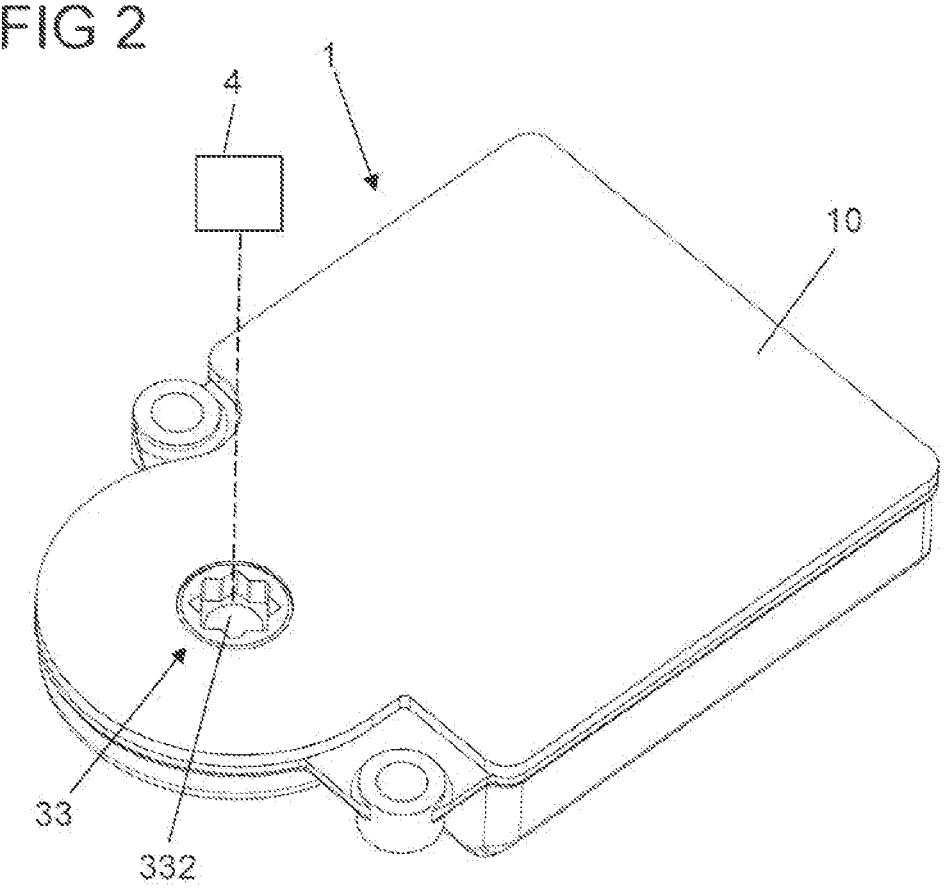
FIG. 2 shows a further view of the actuator.

FIGS. 1 and 2 show an exemplary embodiment of an actuator 1 which serves for adjusting a vehicle assembly, for example an interior assembly, for example on a vehicle seat, on the dashboard, on a console, on a ventilation device or a different adjusting device in the vehicle.

The actuator 1 has a housing 10 which encompasses the electric motor and a gear mechanism. The gear mechanism comprises, amongst other things, an output gear 33 which forms an output for driving a vehicle assembly 4, as is shown schematically in FIG. 2.

As can be seen from the views according to FIGS. 1 and 2 from different sides of the actuator 1 and as is to be described hereinafter in more detail, the output gear has two different output elements 331, 332, via which a coupling to the vehicle assembly 4 can take place, and which can be selectively used by a user. A first output element 331 is in the form of a pinion. A second output element 332, which is formed on a side of the output gear 33 remote from the pinion 331, is accordingly in the form of a toothed engagement portion with internal teeth for coupling, for example, to a shaft.

Figure 3:
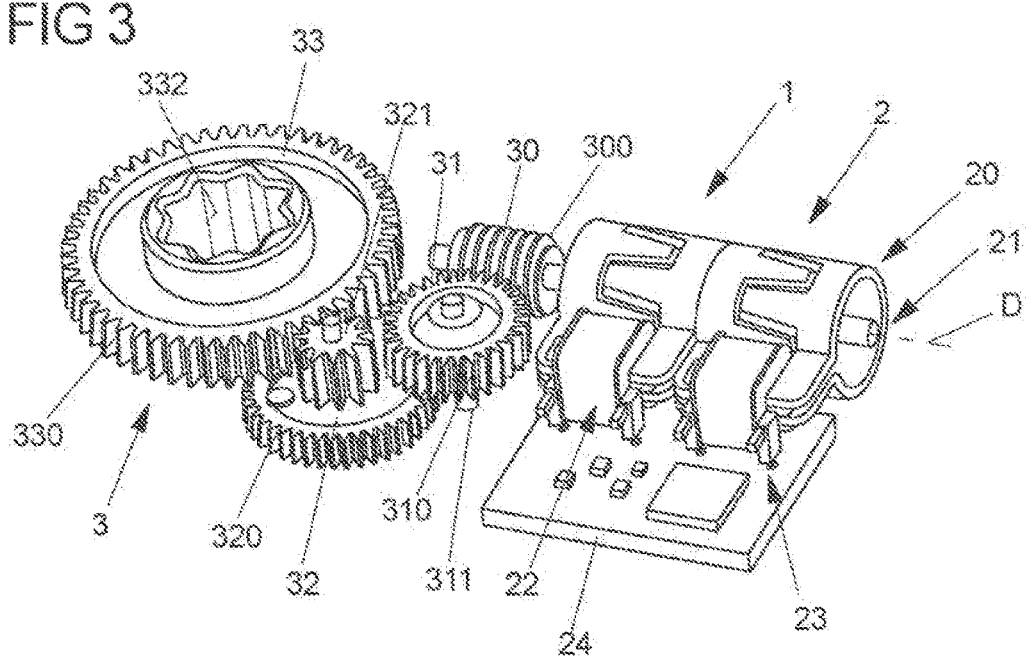
FIG. 3 shows a view of the actuator without a housing.
Figure 4:
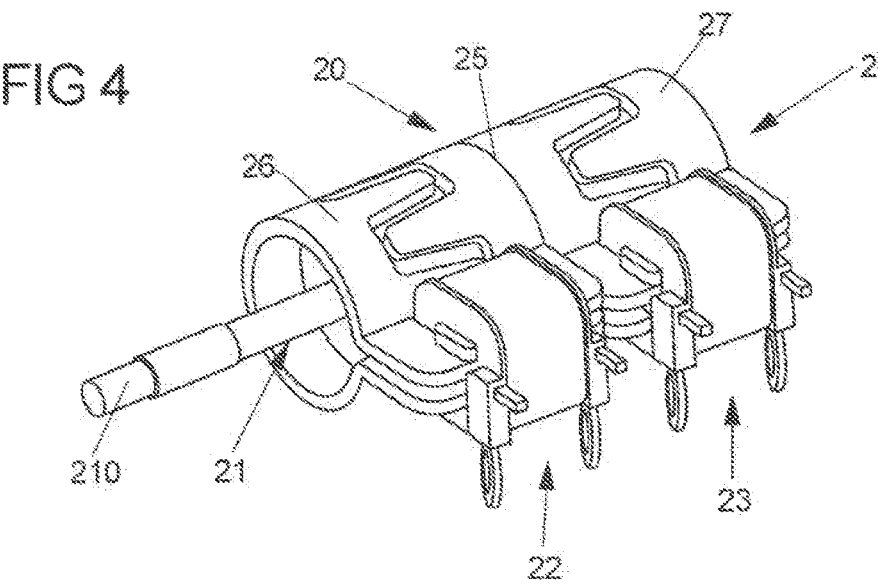
FIG. 4 shows a view of an assembly of the actuator forming a motor.
Figure 5:
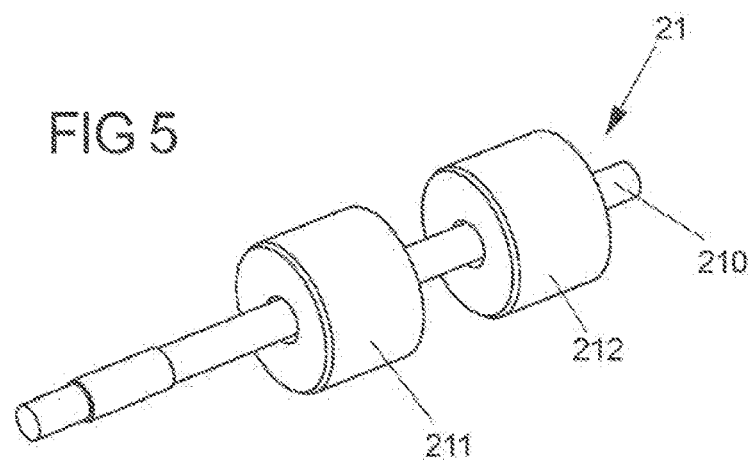
FIG. 5 shows a separate view of a motor shaft with magnet arrangements arranged thereon.

FIG. 3 shows the actuator 1 without the housing 10, FIG. 4 shows the electric motor 2 of the actuator 1 and FIG. 5 shows an exemplary embodiment of a motor shaft of the electric motor with the magnet arrangements 211, 212 arranged thereon.

In the exemplary embodiment shown, the electric motor 2 is implemented by a claw pole stepping motor which has a stator 20 and a rotor 21 which can be rotated relative to the stator 20 about an axis of rotation D. The rotor 21 bears a gear element in the form of a drive worm 30 which, by means of worm gear teeth 300, meshes with spur gear teeth 310 of a gearwheel 31 of the gear mechanism 3 and thus serves for introducing force into the gear mechanism 3.

The gear mechanism 30 has a plurality of gear wheels 31, 32 which form a transmission train for transmitting force from the electric motor 2 to the output gear 33. The gear wheel 31 forms a pinion 311 which meshes with spur gear teeth 320 of the gear wheel 32. The gear wheel 32 forms a pinion 321 which meshes with spur gear teeth 330 of the output gear 33. Since the pinions 311, 321 of the gear wheels 31, 32 have a (significantly) smaller diameter than the spur gear teeth 310, 320, 330 of the gear wheels 31, 32 and the output gear 33, the gear mechanism 3 provides a (force) transmission for adjusting the vehicle assembly 4.

The gear mechanism 30 together with the electric motor 2 is encompassed in the housing 10 of the actuator 1, as shown in FIGS. 1 and 2. An output is provided via the output elements 331, 332 of the output gear 33, a variable coupling to a vehicle assembly 4 being able to be implemented thereby. The output elements 331, 332 can be selectively used by a user, resulting in a variability in the coupling of the actuator 1 to a vehicle assembly 4 to be adjusted.

The stator 20 of the electric motor 2 is configured by stator parts 25, 26, 27 which provide return plates for conducting a magnetic flux (variable over time). The stator parts 25, 26, 27 produce two magnetic circuits to which in each case a stator coil 22, 23 with a coil winding 220, 230 arranged thereon for supplying a magnetic flux is assigned, as can be seen in FIG. 4. The rotor 21 can be adjusted in a stepwise manner via the supplied magnetic flux, in cooperation with the (permanent-magnet) magnet arrangements 211, 212, wherein the increment is determined by the arrangement and sequence of the stator poles of the stator 20, as is to be described in more detail hereinafter. A magnet arrangement 211, 212 of the rotor 21 is assigned to each magnetic circuit.

It should be mentioned at this point that the rotor 21 can also have merely one (single) magnet arrangement 211' as is to be described in more detail hereinafter with reference to FIG. 10.

Figure 6:
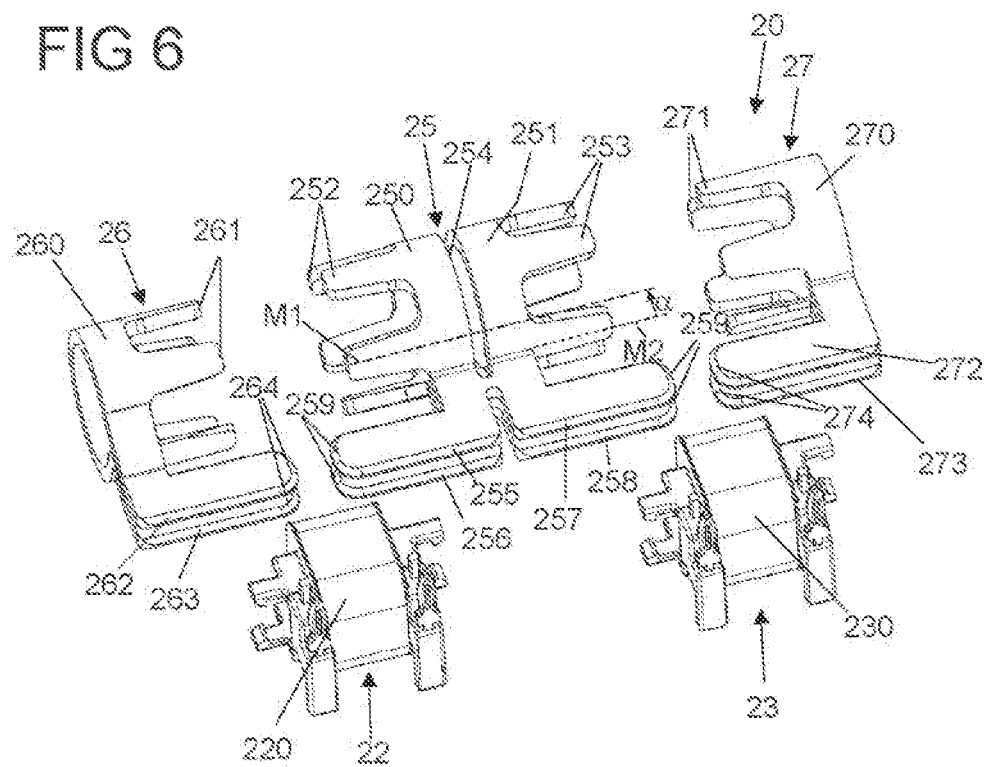
FIG. 6 shows a view of an exemplary embodiment of a stator consisting of stator parts in an exploded view with assigned stator coils.
Figure 7:
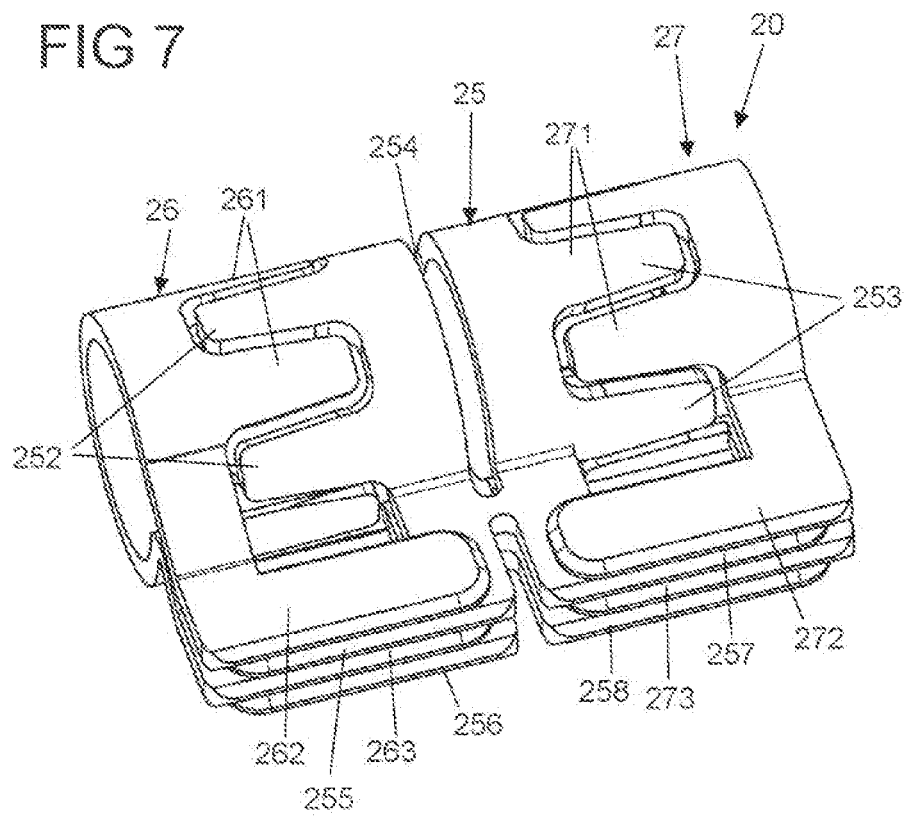
FIG. 7 shows an assembled view of the stator.

In an exemplary embodiment of a stator 20 shown in FIGS. 6-8, the stator 20 is formed by an inner stator part 25 and two outer stator parts 26, 27 which are joined to the inner stator part 25. In the joined position shown in FIG. 7, the stator parts 25, 26, 27 are lined up next to one another along the axis of rotation D, about which the rotor 21 can be rotated relative to the stator 20, and joined together such that stator poles 252, 253, 261, 271 engage in one another in the manner of fingers and for each magnetic circuit are lined up next to one another in a circumferential direction oriented about the axis of rotation D.

The inner stator part 25 is formed integrally and in a single piece as one component. The inner stator part 25 is formed, for example, as a stamped-bent part ("Stanz-Biege-Teil") from a soft magnetic sheet metal.

The outer stator parts 26, 27 are also formed in each case integrally and in a single piece, for example, as stamped-bent parts ("Stanz-Biege-Teile") from a soft magnetic sheet metal.

The inner stator part 25 forms first inner stator poles 252 which face a first outer stator part 26 of the outer stator parts 26, 27 and engage between first outer stator poles 261 of the assigned outer stator part 26, as can be seen from viewing FIGS. 6 and 7 together. The first inner stator poles 252 are formed on an annular body portion 250 of the inner stator part 25 and extend axially from the body portion 250. The first outer stator poles 261 are accordingly formed on an annular body portion 260 of the first outer stator part 26 and extend axially toward the inner stator part 25.

The inner stator part 25 additionally forms second inner stator poles 253 which engage in the manner of fingers between second outer stator poles 271 of a second outer stator part 27, as can be seen from viewing FIGS. 6 and 7 together. The second inner stator poles 253 are formed on a second annular body portion 251 of the inner stator part 25 and extend axially along the axis of rotation D toward the second outer stator part 27. The second outer stator poles 271 are formed on an annular body portion 270 of the second outer stator part 27 and extend axially toward the inner stator part 25.

As can be seen when viewing FIG. 6 in combination with FIG. 8, the first body portion 250 of the inner stator part 25 is detached from the second body portion 251 via an arrangement of circumferentially extending slots 254, namely two slots 254 lined up next to one another. In this manner, a magnetic decoupling of the magnetic circuits can be achieved such that a magnetic flux supplied via the stator coils 22, 23 flows substantially exclusively in the respectively assigned magnetic circuit.

As can be seen from FIG. 7, the stator poles 252, 261; 253, 271 of the respective magnetic circuits are arranged nested in one another such that the stator poles 252, 261; 253, 271 are lined up next to one another alternately in the circumferential direction. The stator poles 252, 261; 253, 271 are trapezoidal, when viewed along an enclosing envelope surface which encloses the cylindrical component of the stator 20; wherein the stator poles 252, 261; 253, 271 in each case taper toward the respective other stator part 25, 26, 27 and engage in one another, forming a relatively narrow uniform gap.

The magnet arrangements 211, 212 on the motor shaft 210 of the rotor 21 run in each case inside the assigned magnetic circuit formed by the stator poles 252, 261; 253, 271, and are driven by supplying a magnetic flux. According to the functional principle of the claw pole stepping motor, the rotor 21 follows the magnetic field of the stator 20 so that the rotor 21 can be adjusted in a stepwise manner.

The stator pole arrangements of the magnetic circuits, as illustrated in FIG. 6, are offset relative to one another by an angular offset α in the circumferential direction. Thus the angular offset α is between the center line M1 of a first inner stator pole 252 and the center line M2 of the second inner stator pole 253 axially adjacent to the first inner stator pole 252. The angular offset α corresponds to the angle about which the periodic arrangements of the first inner stator poles 252 and the second inner stator poles 253 are offset to one another in the circumferential direction. The angular offset α, for example, is less than ¼ of the period angle of the inner stator poles 252, 253.

In the exemplary embodiment shown, the stator 20 is designed with 10 poles. Accordingly, five first outer stator poles 261 are assigned to five first inner stator poles 252, and five second outer stator poles 271 are assigned to five second inner stator poles 253. This results in a 10-pole arrangement for each magnetic circuit. The period angle of the inner stator poles 252, 253 is 72°. If the angular offset α is exactly ¼ of this period angle, the angular offset α is 18°.

By the angular offset α a relatively small increment can be set for the stepping motor. The magnet arrangements 211, 212 of the rotor 21 are aligned with one another and are not offset to one another in the arrangement of their magnetic poles in the circumferential direction.

A stator coil 22, 23 is assigned to each magnetic circuit, as can be seen from FIG. 4 when viewed in combination with FIG. 6. The stator parts 25, 26, 27 (implementing the return plates) form at the ends of the cylindrically formed stator parts 25, 26, 27, when manufactured at stamped-bent parts, engagement portions 255, 256, 262, 263; 257, 258, 272, 273 which are arranged so as to be sandwiched to one another and so as to overlap alternately, as can be seen in FIG. 7, and in each case provide a seat for the assigned stator coil 22, 23.

Thus first inner engagement portions 255, 256 are formed on the inner stator part 25, the first inner engagement portions facing toward the first outer stator part 26 and being arranged so as to alternate and overlap with first outer engagement portions 262, 263 of the first outer stator part 26, as can be seen in FIG. 7. The engagement portions 255, 256, 262, 263 engage together in a coil body of the assigned stator coil 22 and in each case have a chamfer 259, 264 on the peripheral edges which facilitates insertion into the stator coil 22.

Additionally, the inner stator part 25 forms second inner engagement portions 257, 258 which are arranged so as to overlap and alternate with second outer engagement portions 272, 273 of the second outer stator part 27, as can be seen in FIG. 7. In turn, the engagement portions 257, 258, 272, 273 have on their peripheral edges chamfers 259, 274 which facilitate the insertion into a coil body of the assigned stator coil 23. In turn, the engagement portions 257, 258, 272, 273 together form a seat for the assigned stator coil 23.

As the engagement portions 255, 256, 262, 263; 257, 258, 272, 273 for each magnetic circuit are arranged so as to be sandwiched to one another and engage together in the coil body 22, 23 of the respectively assigned stator coil, this results in the stator parts 25, 26, 27 being positioned relative to one another via the engagement portions 255, 256, 262, 263; 257, 258, 272, 273. The stator parts 25, 26, 27 are held relative to one another via the engagement portions 255, 256, 262, 263; 257, 258, 272, 273 and are positioned relative to one another in the correct manner by the engagement in the respectively assigned stator coil 22, 23.

Since the inner stator part 25 is manufactured integrally and in a single piece, this results in greater level of stiffness for the stator 20. This also results in a simple production of the electric motor 2, since a joining process for separate inner stator parts can be dispensed with.

Since chamfers 259, 264, 274 are formed on the engagement portions 255, 256, 262, 263; 257, 258, 272, 273 on the peripheral edges, this results in a simple joining of the stator parts 25, 26, 27 to one another and to the stator coils 22, 23, with an accurate positioning of the stator parts 25, 26, 27 and the stator coils 22, 23 relative to one another.

As can be seen in FIG. 5, the magnet arrangements 211, 212 of the rotor 21 are arranged on the motor shaft 210 and fixed to the motor shaft 210 fixedly in terms of rotation. Due to the angular offset α between the magnetic circuits, the magnet arrangements 211, 212 with their pole arrangements cannot be arranged with an angular offset to one another. The same parts can be used for the magnet arrangements 211, 212 resulting in a simple cost-effective manufacturing process.

Figure 9A:
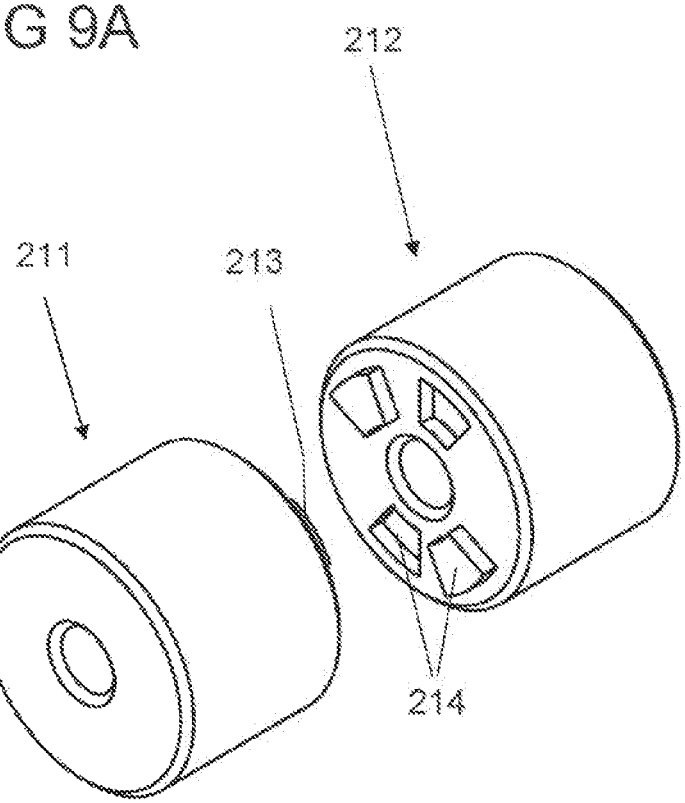
FIG. 9A shows a view of an exemplary embodiment of magnet arrangements of a rotor in a detached position.
Figure 9B:
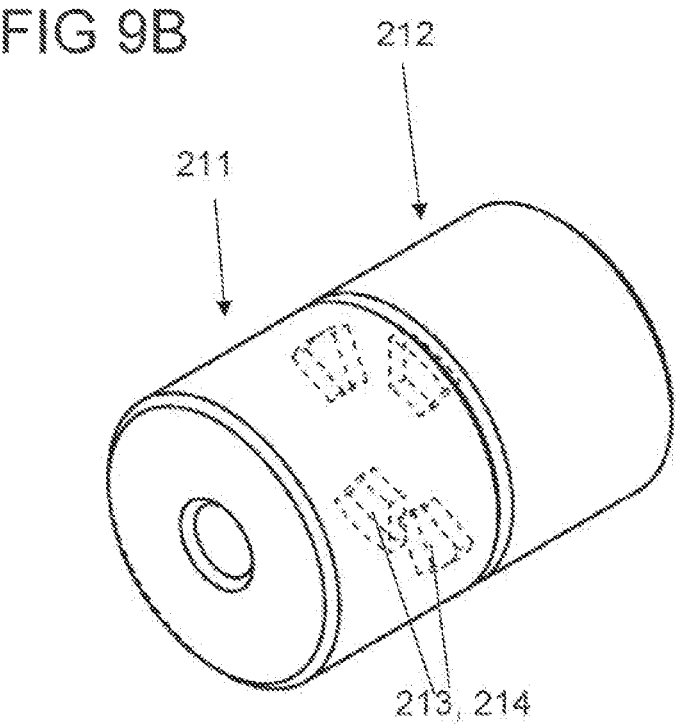
FIG. 9B shows a view of the magnet arrangements in a joined position.

In order to ensure a positioning of the magnet arrangements 211, 212 at the correct angle, the magnet arrangements 211, 212 as is shown in FIGS. 9A and 9B, in each case have form-fitting elements 213, 214 in the form of elevations and/or recesses which engage in one another in a complementary manner when the magnet arrangements 211, 212 are positioned on one another and thus automatically position the magnet arrangements 211, 212 at the correct angle relative to one another due to an interaction by form-fitting. This results in a simple arrangement and joining of the magnet arrangements 211, 212 to the motor shaft 210.

Figure 10:
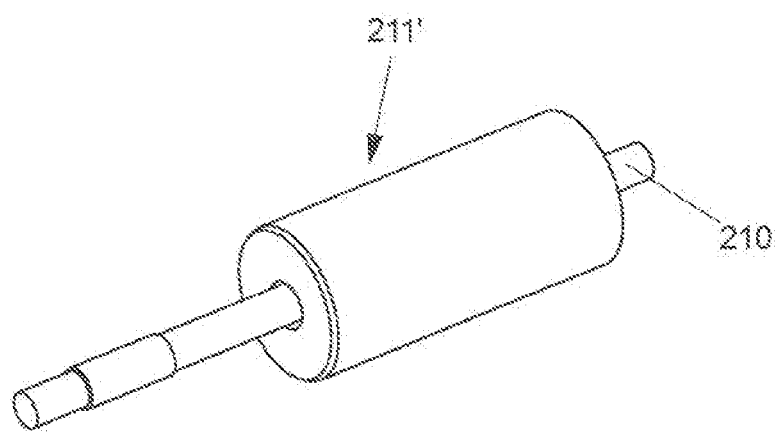
FIG. 10 shows a view of a further exemplary embodiment of a magnet arrangement which is arranged on a motor shaft.

In a further exemplary embodiment shown in FIG. 10, only one (single) magnet arrangement 211' is arranged on the motor shaft 210. The magnet arrangement 211' cooperates with the two magnetic circuits, which are formed by the first inner stator poles 252 and the first outer stator poles 261 and by the second inner stator poles 253 and the second outer stator poles 271, and accordingly extends over an axial length on the motor shaft 210 such that the magnet arrangement 211' extends into the region of both magnetic circuits.

Figure 11:
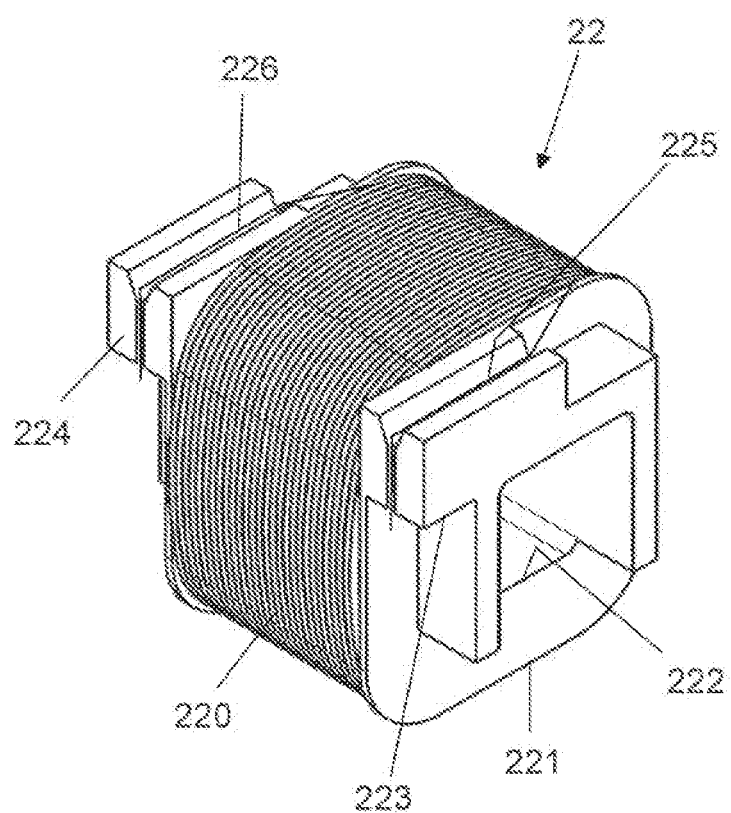
FIG. 11 shows a view of an exemplary embodiment of stator coil.
Figure 12A:
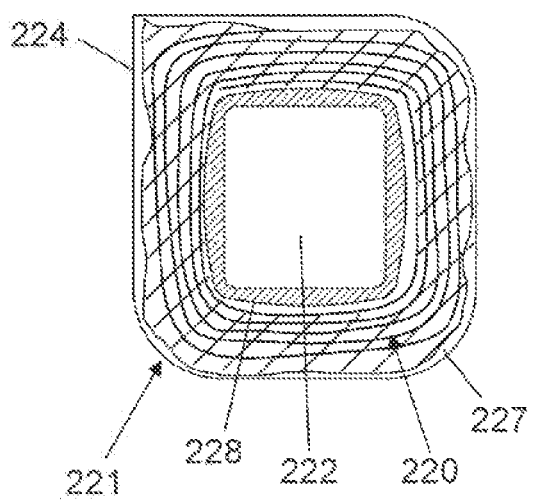
FIG. 12A shows a side view of the stator coil.
Figure 12B:
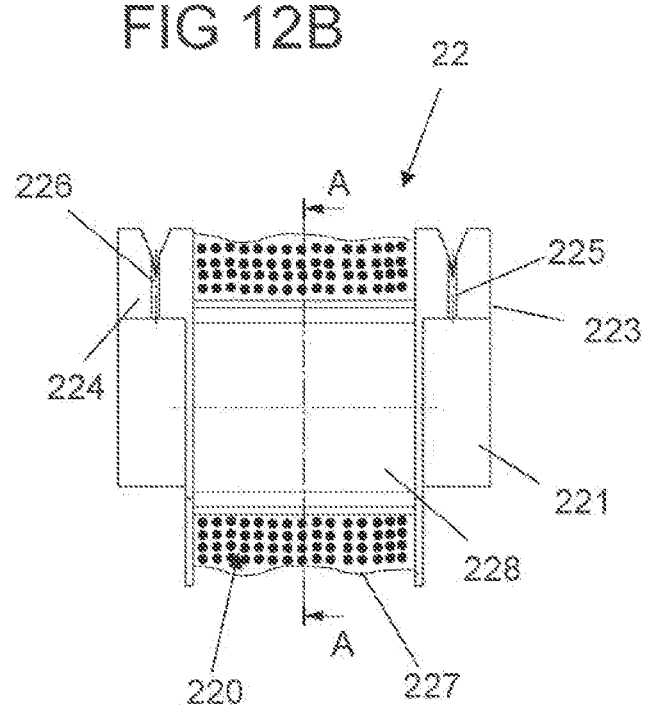
FIG. 12B shows a sectional view along the line A-A according to FIG. 12A.

FIGS. 11 and 12A, 12B show views of a stator coil 22, wherein the stator coils 22, 23 are preferably configured identically and thus the description with reference to FIGS. 11 and 12A, 12B also applies in an identical manner to the stator coil 23.

The stator coil 22 has a coil body 221 which forms a winding portion 228, a coil winding 220 being arranged thereon. The coil winding 220 is formed by a wire wound around the winding portion 228 and which, by means of wire ends 225, 226, is guided via wire guides 223, 224 away from the winding portion 228 and moved toward a printed circuit board of a control unit 24, as can be seen in FIG. 11 when viewed together with FIG. 3.

The wire ends 225, 226 can be connected directly to the printed circuit board by a material connection, for example via a soldered connection. Alternatively, the wire ends 225, 226 can also be connected to solder pins, which are fixed to the coil body 221, via which the stator coil 22 is inserted into assigned openings in the printed circuit board and can be soldered to the printed circuit board.

The stator body 221 forms an engagement opening 222 into which the engagement portions 255, 256, 262, 263 of the assigned magnetic circuit of the stator 20 can engage and via which, therefore, a mechanical positioning of the stator coil 22 is implemented on the stator parts 25, 26, 27, together with the supply of a magnetic flux.

As can be seen in FIGS. 12A and 12B, the winding portion 228 has a crowned shape without sharp edges. The wire forming the coil winding 220 can thus be arranged in a tightly packed manner on the winding portion 228, wherein additionally a molding compound 227, for example in the form of a casting compound, can encapsulate the coil winding 220, in order to prevent in this manner a movement of the wire during operation and thus to prevent a generation of noise associated therewith.

Figure 13:
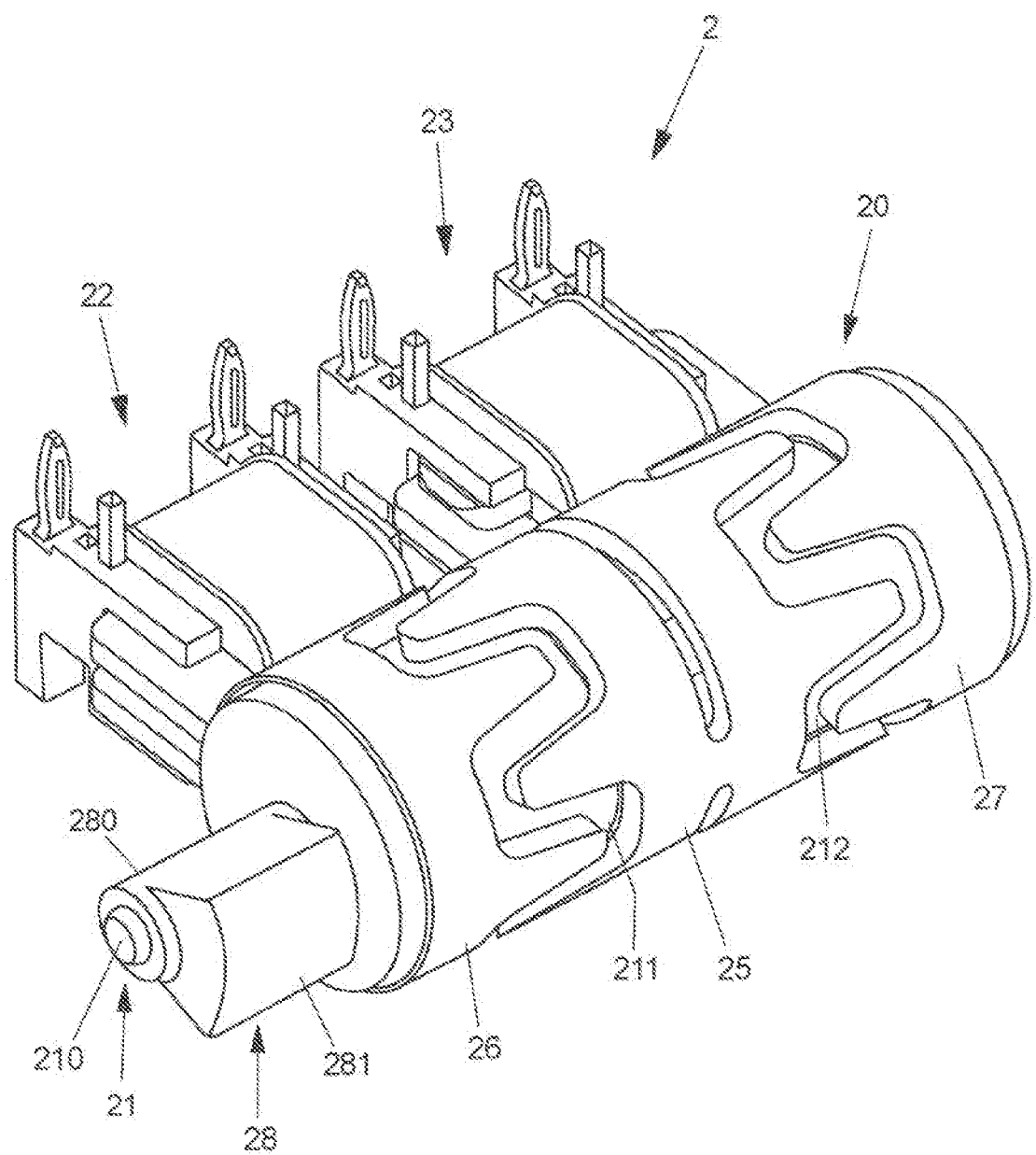
FIG. 13 shows a view of an exemplary embodiment of an actuator with a motor, which has an imbalance element for generating a vibration.

FIG. 13 shows an exemplary embodiment of an actuator 1 which has a motor 2 which in its functional components can be designed identically to the motor 2 according to the above-described exemplary embodiments, so that reference is made to the above explanations regarding the functional components of the motor 2.

For example, the motor 2 has a stator 20 and a rotor 21 which can be rotated about an axis of rotation. The stator 20 is formed by an inner stator part 25 and outer stator parts 26, 27. Stator coils 22, 23 are operatively connected to the stator parts 25, 26, 27, in order to generate a magnetic flux between the stator poles of the stator 20. Magnet arrangements 211, 212 are arranged on the rotor 21 for providing an excitation field.

The actuator according to FIG. 13 serves for generating a vibration, for example for a vibration device, in order to provide a massage function on a vehicle seat.

In the exemplary embodiment shown, an imbalance element 28 is arranged on the motor shaft 210 of the rotor 21, the imbalance element being arranged axially outside the stator 20 formed by the inner stator part 25 and the outer stator parts 26, 27. The imbalance element 28 has a connecting portion 280 via which the imbalance element 28 is connected to the motor shaft 210. An eccentric portion 281 protrudes eccentrically from the motor shaft 210 and in this manner generates an imbalance on the rotor 21.

If the rotor 21 is set in rotational motion, the imbalance on the rotor 21 causes a vibration on the motor 2, the vibration being transmitted to an assembly to be excited and on which the motor 2 is arranged. The assembly to be excited is thus set in vibrational motion.

Figure 14:
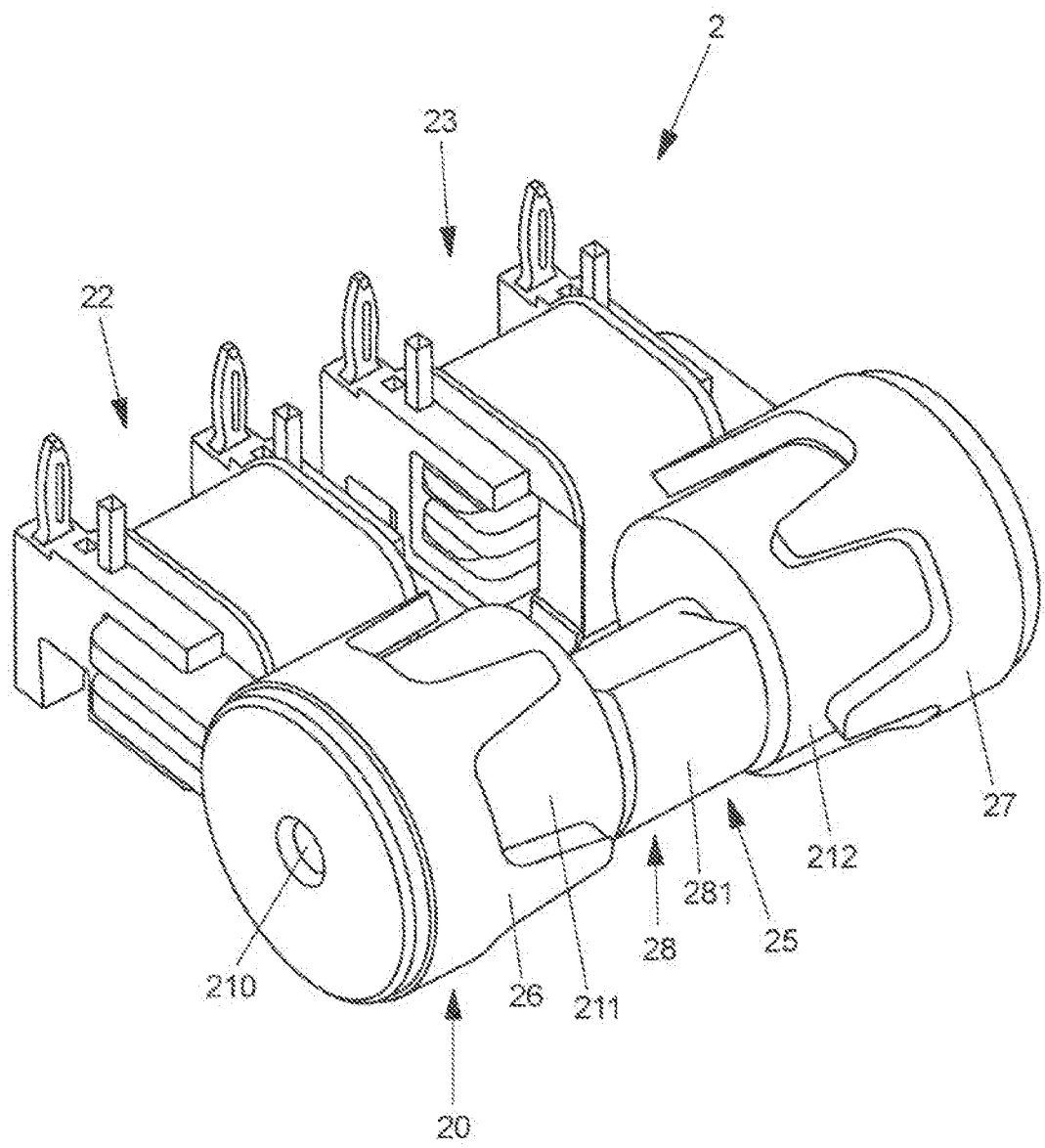
FIG. 14 shows a view of a further exemplary embodiment of an actuator with a motor which has an imbalance element.

In a further exemplary embodiment shown in FIG. 14, the imbalance element 28 is not arranged axially outside the stator 20 but is integrated in the stator 20, by the imbalance element 28 being axially arranged at the location of the inner stator part 25 (not shown in FIG. 14 for the sake of clarity) and being encompassed radially inside the inner stator part 25. The imbalance element 28 is arranged between the magnet arrangements 211, 212 on the motor shaft 210 assigned to the different stator pole arrangements.

As in the exemplary embodiment according to FIG. 13, the imbalance element 28 is connected to the motor shaft 210 and set in rotational motion with a rotational movement of the rotor 21, so that a vibration is generated due to the imbalance of the eccentric portion 281 of the imbalance element 28.

The idea on which the invention is based is not limited to the above-described exemplary embodiments but can also be implemented in different ways.

The magnetic circuits do not necessarily have an angular offset to one another on their stator poles. The magnetic circuits can also be configured without an angular offset to one another. In this case, for example, the magnet arrangements can have an angular offset in their magnetic pole arrangements on the motor shaft.

In the above-described exemplary embodiments, the stator is configured with 10 poles. Each magnetic circuit thus has an arrangement of ten stator poles. A different number of poles is also conceivable and possible, for example an 8-pole or a 12-pole arrangement.

Since the stator coils are arranged to the side of the stator, this results in a compact design in which, for example, the diameter of the stator can be reduced in comparison with an arrangement in which the stator coils are wound around the circumference of the stator. Accordingly, an actuator can be provided with a low overall height and thus a small installation space requirement.

LIST OF REFERENCE SIGNS

1 Actuator
10 Housing
2 Motor
20 Stator
21 Rotor
210 Motor shaft
211, 212 Magnet arrangement
211' Magnet arrangement
213, 214 Form-fitting element
22, 23 Coil
220, 230 Coil winding
221 Coil body
222 Engagement opening
223, 224 Wire guide
225, 226 Wire end
227 Molding compound
228 Winding portion
24 Control unit (printed circuit board)
25 Stator part
250, 251 Body portion
252, 253 Stator pole
254 Slot
255-258 Engagement portion (lug)
259 Chamfer
26 Stator part
260 Body portion
261 Stator pole
262, 263 Engagement portion (lug)
264 Chamfer
27 Stator part
270 Body portion
271 Stator pole
272, 273 Engagement portion (lug)
274 Chamfer
28 Imbalance element
280 Connecting portion
281 Eccentric portion
3 Gear mechanism
30 Drive worm
300 Worm teeth
31 Gearwheel
310 Spur gear teeth
311 Pinion
32 Gearwheel
320 Spur gear teeth
321 Pinion
33 Output gear
330 Spur gear teeth
331 First output element (pinion)
332 Second output element (toothed engagement portion)
4 Vehicle assembly
α Angle
D Axis of rotation
M1, M2 Center line

The invention claimed is:

1. An actuator, comprising:
an electric motor having a stator and a rotor that can be rotated relative to the stator about an axis of rotation-, wherein
the stator comprises an inner stator part, a first outer stator part and a second outer stator part, wherein the inner stator part, the first outer stator part and the second outer stator part are lined up next to one another along the axis of rotation, and the inner stator part forms an arrangement of first inner stator poles on a first side axially facing the first outer stator part, and forms an arrangement of second inner stator poles on a second side axially facing the second outer stator part, wherein the first inner stator poles and the second inner stator poles are connected to one another integrally and in a single piece,
wherein the motor includes a first stator coil and a second stator coil, wherein the inner stator part includes at least one first inner engagement portion which engages in the first stator coil and at least one second inner engagement portion which engages in the second stator coil,
wherein the at least one first inner engagement portion and the at least one second inner engagement portion are arranged radially outside of the first inner stator poles and the second inner stator poles, wherein the first outer stator part comprises at least one first outer engagement portion which is arranged so as to overlap with the at least one first inner engagement portion and engages in the first stator coil, and the second outer stator part includes at least one second outer engagement portion which is arranged so as to overlap with the at least one second inner engagement portion and engages in the second stator coil, wherein the first stator coil comprises a first coil body and a first coil winding arranged on the first coil body and the second stator coil comprises a second coil body and a second coil winding arranged on the second coil body, wherein the first coil body forms a first engagement opening about which the first coil winding extends, the at least one first inner engagement portion and the at least one first outer engagement portion engaging with the first engagement opening, and the second coil body forms a second engagement opening about which the second coil winding extends, the at least one second inner engagement portion and the at least one second outer engagement portion engaging with the second engagement opening.

2. The actuator of claim 1, wherein the inner stator part comprises a first body portion on which the first stator poles are formed, and a second body portion which is formed integrally and in a single piece with the first body portion and on which the second stator poles are formed.

3. The actuator of claim 1, wherein the inner stator part is formed as a stamped-bent part.

4. The actuator of claim 1, wherein the at least one first inner engagement portion and/or the at least one second inner engagement portion include a chamfer on at least one edge.

5. The actuator of claim 1, wherein the at least one first outer engagement portion or the at least one second outer engagement portion includes a chamfer on at least one edge.

6. The actuator of claim 1, wherein the coil body forms a winding portion on which the coil winding is arranged and which has a crowned shape.

7. The actuator of claim 1, wherein the motor comprises a control unit, wherein the coil winding of each stator coil is electrically connected by at least one wire end to the control unit.

8. The actuator of claim 1, wherein the first outer stator part forms an arrangement of first outer stator poles for electromagnetic cooperation with the first inner stator poles and/or the second outer stator part forms an arrangement of second outer stator poles for electromagnetic cooperation with the second inner stator poles.

9. The actuator of claim 8, wherein the first outer stator poles and the first inner stator poles engage in one another such that the first outer stator poles and the first inner stator poles are lined up next to one another alternately in a circumferential direction oriented about the axis of rotation, and/or in that the second outer stator poles and the second inner stator poles engage in one another such that the second outer stator poles and the second inner stator poles are lined up next to one another alternately in a circumferential direction oriented about the axis of rotation.

10. The actuator of claim 1, wherein the first inner stator poles and the second inner stator poles are trapezoidal, when viewed along an imaginary envelope surface circumferentially enclosing the inner stator part about the axis of rotation.

11. The actuator of claim 10, wherein the first inner stator poles and the second inner stator poles include an angular offset (α) to one another, when viewed in a circumferential direction about the axis of rotation.

12. An actuator, comprising:

an electric motor having a stator and a rotor that can be rotated relative to the stator about an axis of rotation, wherein the stator comprises
an inner stator part,
a first outer stator part and
a second outer stator part,
wherein the inner stator part, the first outer stator part and the second outer stator part are lined up next to one another along the axis of rotation, and the inner stator part forms an arrangement of first inner stator poles on a first side axially facing the first outer stator part, and forms an arrangement of second inner stator poles on a second side axially facing the second outer stator part,
wherein the first inner stator poles and the second inner stator poles are connected to one another integrally and in a single piece, wherein the rotor comprises a first magnet arrangement assigned to the arrangement of the first inner stator poles and a second magnet arrangement assigned to the arrangement of the second inner stator poles, wherein the first magnet arrangement and the second magnet arrangement are offset to one another axially along the axis of rotation, wherein the first magnet arrangement includes at least one first form-fitting element and the second magnet arrangement has at least one second form-fitting element, wherein the at least one first form-fitting element and the at least one second form-fitting element are in engagement with one another for rotationally positioning the first magnet arrangement and the second magnet arrangement relative to one another.

13. The actuator of claim 12, wherein the first magnet arrangement is configured to cooperate with the first inner stator poles for generating a torque on the rotor, and the second magnet arrangement is configured to cooperate with the second inner stator poles for generating a torque on the rotor.

14. An actuator, comprising:

an electric motor having a stator and a rotor that can be rotated relative to the stator about an axis of rotation, and;
a gear mechanism,
wherein the stator comprises
an inner stator part,
a first outer stator part and
a second outer stator part,
wherein the inner stator part, the first outer stator part and the second outer stator part are lined up next to one another along the axis of rotation, and the inner stator part forms an arrangement of first inner stator poles on a first side axially facing the first outer stator part, and forms an arrangement of second inner stator poles on a second side axially facing the second outer stator part,
wherein the first inner stator poles and the second inner stator poles are connected to one another integrally and in a single piece,
wherein the rotor comprises a magnet arrangement which is configured to cooperate both with the first inner stator poles and with the second inner stator poles for generating a torque on the rotor;
wherein the electric motor is configured to drive the gear mechanism, wherein the gear mechanism forming an output for adjusting a vehicle assembly, wherein the output is formed by an output gear,
wherein the output gear comprises a first output element and a second output element which is different from the first output element, wherein the first output element is formed by a pinion with external teeth and the second output element is formed by a toothed engagement portion with internal teeth, wherein an imbalance element which is connected to the rotor and includes an eccentric portion relative to the axis of rotation for providing an imbalance on the rotor.

15. The actuator of claim 14, wherein the imbalance element is arranged outside the stator formed by the inner stator part, the first outer stator part and the second outer stator part.

16. The actuator of claim 14, wherein the imbalance element is arranged inside the inner stator part.

\* \* \* \* \*